United States Patent [19]
Nepote

[11] Patent Number: 6,098,324
[45] Date of Patent: Aug. 8, 2000

[54] ANIMAL IDENTIFICATION DEVICE AND METHOD OF MANUFACTURE

[75] Inventor: Alain Nepote, Cluses, France

[73] Assignee: Reydet Finance, Cluses, France

[21] Appl. No.: 09/095,344

[22] Filed: Jun. 10, 1998

[30] Foreign Application Priority Data

Jun. 11, 1997 [FR] France ................................ 97 07549
Sep. 16, 1997 [FR] France ................................ 97 11726

[51] Int. Cl.[7] ............................................... G09F 3/00
[52] U.S. Cl. ........................... 40/301; 40/300; 40/302; 40/668
[58] Field of Search ..................... 40/300, 301, 302, 40/668; 119/655

[56] References Cited

U.S. PATENT DOCUMENTS

| | | | |
|---|---|---|---|
| 4,441,233 | 4/1984 | Swift | 24/16 PB |
| 4,535,557 | 8/1985 | Porcher | 40/300 |
| 4,718,374 | 1/1988 | Hayes | 40/301 X |
| 4,718,697 | 1/1988 | Berardus van Amelsfort | 283/107 |
| 4,785,563 | 11/1988 | Friedman | 40/301 |
| 5,166,502 | 11/1992 | Rendleman et al. | 40/27.5 X |
| 5,357,700 | 10/1994 | Schulte | 40/301 |
| 5,461,807 | 10/1995 | Johnson | 40/300 X |
| 5,588,234 | 12/1996 | De Jong et al. | 40/301 |
| 5,768,813 | 6/1998 | Reboul et al. | 40/301 |

FOREIGN PATENT DOCUMENTS

| | | | |
|---|---|---|---|
| 816454 | 3/1981 | U.S.S.R. | 40/301 |
| WO 91/10982 | 7/1991 | WIPO | 40/302 |

*Primary Examiner*—Terry Lee Melius
*Assistant Examiner*—Andrea Chop
*Attorney, Agent, or Firm*—Fay, Sharpe, Fagan, Minnich & McKee, LLP

[57] ABSTRACT

A male portion (5) of an identification tag (1) has a projection or dart (6) which extends through the item to be identified. The projection is lockingly received in a corresponding passage (7) of a female member (4). One of the elements, preferably the female element, has an electronic label (8) encased therein. More specifically to be preferred embodiment, the electronic label, which is electromagnetically encodable and readable, is placed on a bottom wall (19) of a cavity (9) which is defined by peripheral side walls (11). One of the peripheral side walls and the bottom wall of the cavity define undercut or dove-tailed recesses (12). A polymer (10) is placed in the cavity in a fluid state filling the undercut recesses. The polymer is hardened, e.g. polymerized, to form a tamper proof bond with the female member.

11 Claims, 5 Drawing Sheets

ANIMAL IDENTIFICATION DEVICE AND METHOD OF MANUFACTURE

BACKGROUND OF THE INVENTION

The present invention relates to identification devices, particularly identification devices for animals. More specifically, it relates to information carrier and attachment mechanism for such devices. It is to be appreciated, however, that the identification device will also find uses such as identifying luggage, golf bags, or other objects.

The identification of animals, particularly farm raised animals destined for human consumption, is an issue of concern. In particular, in modern industrialized countries, the origin, the place the animal was raised, and its history are of particular concern. At the present time, these problems have become more sensitive and significant due to the "mad cow" crisis.

There are numerous types of identification devices in existence, such as rings, tattoos, and identification tags or clips. The latter are attached to the ear of the animal. Generally they include inkjet or laser markings which identify, for example, the animal as well as the location where it was raised.

These devices, however, present numerous drawbacks. Specifically, one drawback resides in wear and tear which may partially erase the ink markings. Another problem is that the identification devices are sometimes formed of toxic or otherwise prohibited materials. Prohibited materials may also be introduced in conjunction with the laser or inkjet marking process.

The present invention proposes to resolve the aforementioned drawbacks with a simple, reliable, safe, and effective identification device.

SUMMARY OF THE INVENTION

In accordance with the present invention, an identification device is provided which includes an information carrier in the form of an electronic identification label.

In accordance with a complimentary feature, the identification device includes an information tag formed by a male element and a female element. At least one of the male and female elements includes a cavity in which the electronic information carrier is disposed.

In accordance with another feature, the cavity includes a retention means which holds the electronic information carrier in a fixed position.

According to a preferred embodiment of the identification device, a retention means includes a set of molded retainer sections which are arranged in the cavity on its peripheral or bottom walls.

In accordance with another feature, recessed retainer sections are defined in an undercut shape or a slightly dove-tailed configuration.

According to a complimentary feature of the identification device, the male or female element which contains the cavity is made of injection molded plastic.

In accordance with a preferred embodiment of the identification device, the cavity is situated on an internal surface of the female element facing toward the male element.

In accordance with another complimentary feature, filler material which is placed in the cavity with the electronic identification label is a hardenable resin material, such as a polymerizable resin.

Further, the invention relates to a method of manufacturing an identification device. The method includes placing the information carrier in the cavity and pouring filler material, such as a hardenable resin, into the cavity.

One advantage of the present invention is that it provides a secure and permanent identification of the animal or other object to which it is attached.

Another advantage of the present invention is that is free from toxic substances.

Another advantage resides in its durability and ability to retain its identification characteristics even when exposed to sunlight, rain or snow, detergents and other adverse conditions to which farm animals may be subjected.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
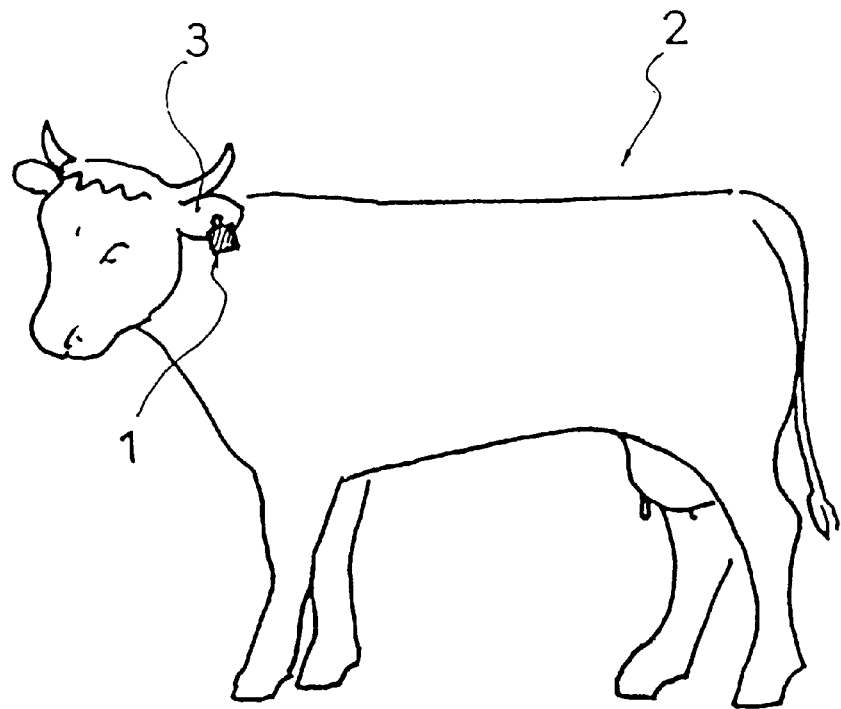
FIG. 1 is a diagrammatic illustration of a cow fitted with an identification device in accordance with the present invention.

With reference to FIG. 1, an identification device, particularly an identification tag 1 is attached to one of the ears 3 of an animal 2, such as a cow. The tag includes two elements: a first or female element 4 and a second or male element 5.

Figure 2:
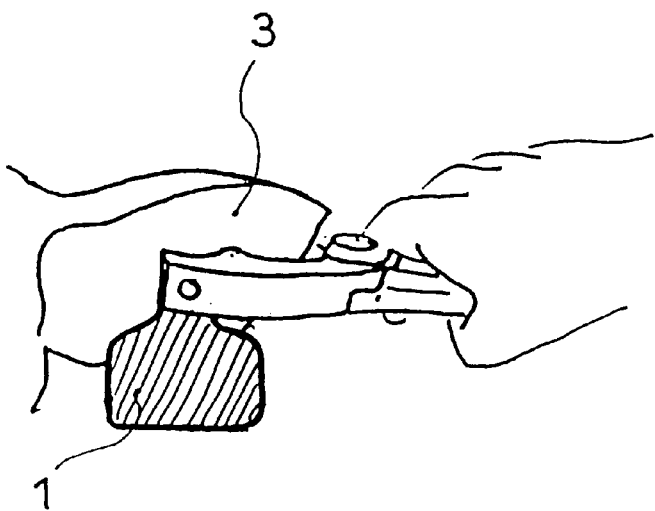
FIG. 2 demonstrates the process for attaching the identification device to the ear of a cow.
Figure 3:
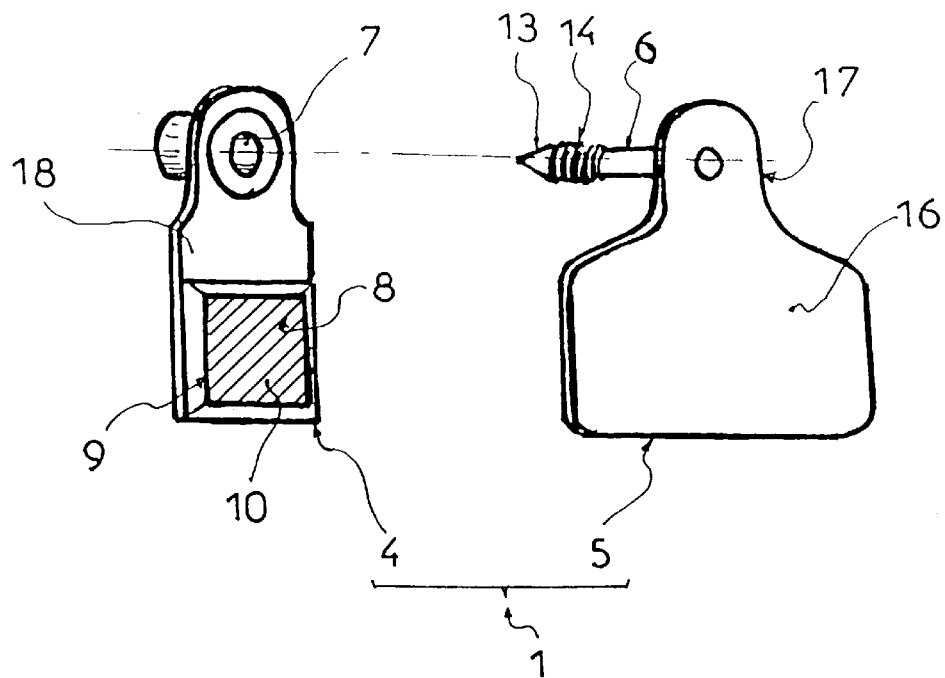
FIG. 3 is a perspective and expanded view of a preferred embodiment of the identification device prior to installation.

With reference to FIGS. 2 and 3, fixation of the device to the ear of the animal is accomplished via cooperation of a projection or dart 6 of the male element 5 with a recess or bore 7 of the female element 4. The projection or dart 6 has a conical point 13 for piercing the ear 3 of the animal 2. A locking means in the form of angular notches or grooves 14 prevents removal of the tag by separation of the male and female elements once it is attached to the ear. The annular notches have a truncated shape including camming surfaces facing toward the point 14 and undercut or vertical surfaces facing the opposite way for interactively engaging corresponding annular projections arranged on an interior of the recessed portion or bore 7 of the female element 4.

These two elements are attached through the ear 3 of the animal using a pair of manual pliers or other insertion mechanism.

One of the elements, the female element 4 in the preferred embodiment, contains identification data. More specifically, an information carrier 8, such as an electronic label carries the data. The information carrier is affixed to one of the male and female elements of the identification device 1.

In the preferred embodiment, the electronic label 8 includes a thin, semi-rigid carrier of synthetic material on which metallic coils or spirals are imprinted or affixed. These coils are interconnected with an electronic chip which electronically contains the identification data. In order to access the data, the identification tag is brought adjacent a reader. The reader generates electromagnetic fields which induce sufficient current in the coils to power the electronic chip. Once the electronic chip is powered, the reader communicates with the chip such that it communicates its data to the reader via the coils. Preferably, the electronic chip includes an EPROM or other electronic memory device which is updatable, programmed to prevent recorded data from being overwritten or erased, and retains its information in the absence of a biasing electrical field. Alternately, the electronic label can be manufactured with an unalterable resistive, inductive, electromagnetic, or other electronically readable encoding.

In the preferred embodiment, the male element 5 includes a flat wall 16 having a generally rectangular shape with an extended fixation tongue 17 which extends transversely and orthogonally to the generally rectangular portion. The projecting portion or dart 6 extends from the fixation tongue. Preferably, the male portion is integrally injection molded. The female element 4 likewise includes a flat wall 18 having, preferably, a rectangular shape whose dimension are smaller than the dimensions of the flat wall 16 of the male element.

Figure 4:
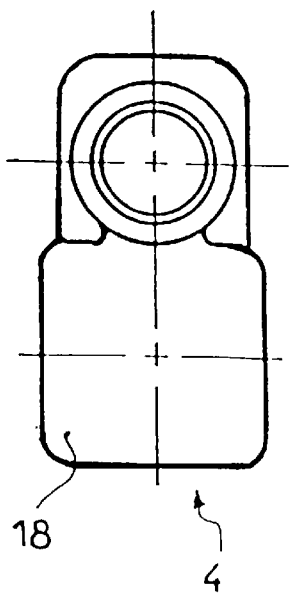
FIG. 4 is a rear view of the female element of the identification tag.
Figure 5:
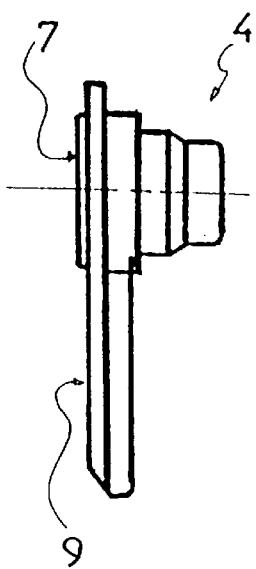
FIG. 5 is a side view of the female element of the identification tag.
Figure 6:
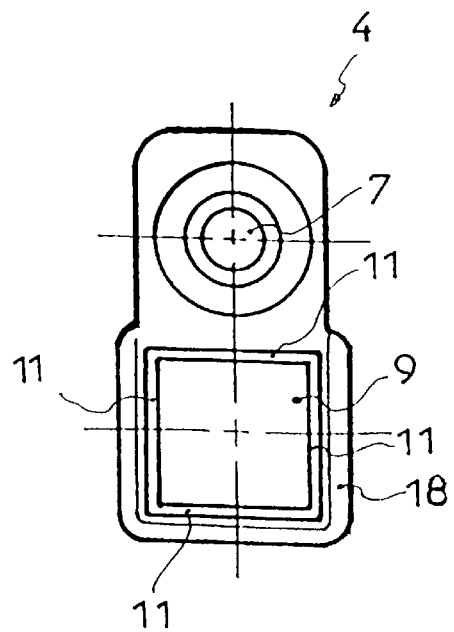
FIG. 6 is a front view of the female element of the identification tag.

With continuing reference to FIG. 3 and further reference to FIGS. 4, 5, and 6, the electronic label 8 is fastened in tamper-proof and water-proof fashion to one of the elements, preferably the female element. More specifically to the preferred embodiment, the electronic label is lodged in a recess or cavity 9 which also receives a filler material 10 such as hardenable resin.

Figure 7:
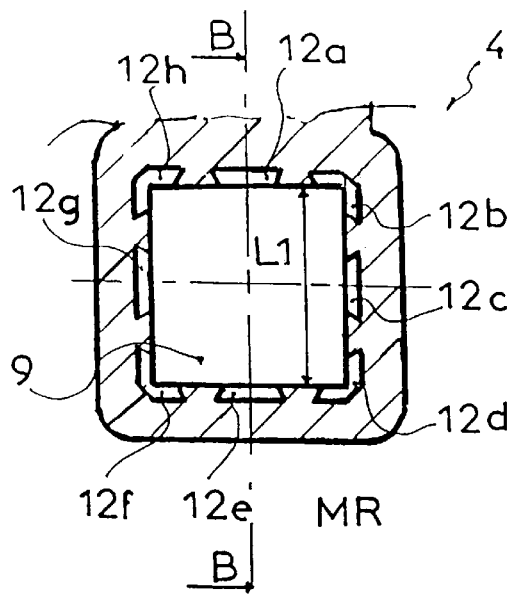
FIG. 7 is a longitudinal section view of the retention mechanism for the filler material of the female element taken along section A—A of FIG. 8.
Figure 8:
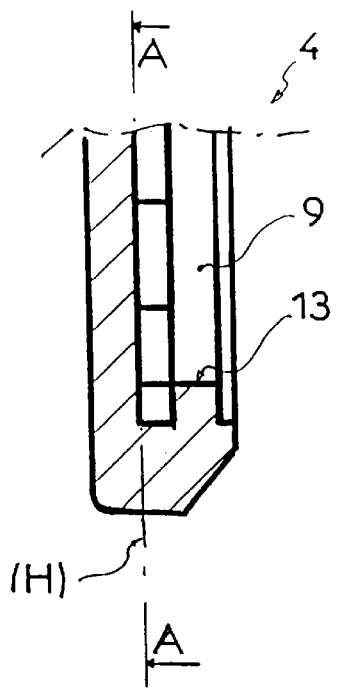
FIG. 8 is a transverse sectional view of the female element taken along section B—B of FIG. 7.

The cavity includes a retention means MR for the filler material. In the embodiment of FIG. 6, the retention means includes a peripheral flange 11 which juts out from the peripheral wall defining an undercut region there below. In this manner, accidental or voluntary removal of the electronic label 8 is prevented to guarantee that the electronic label remains unviolated. With reference to FIGS. 7 and 8, below the peripheral flange 11, the peripheral wall includes a plurality of alternating retention sections and recesses 12a, 12b, 12c, 12d, 12e, 12f, 12g, 12h. Each of the retention sections is preferably undercut in a dove-tail shape to anchor the filler material more securely. Due to the pliability of the material, this undercut shape can be realized by injection molding techniques.

Figure 9:
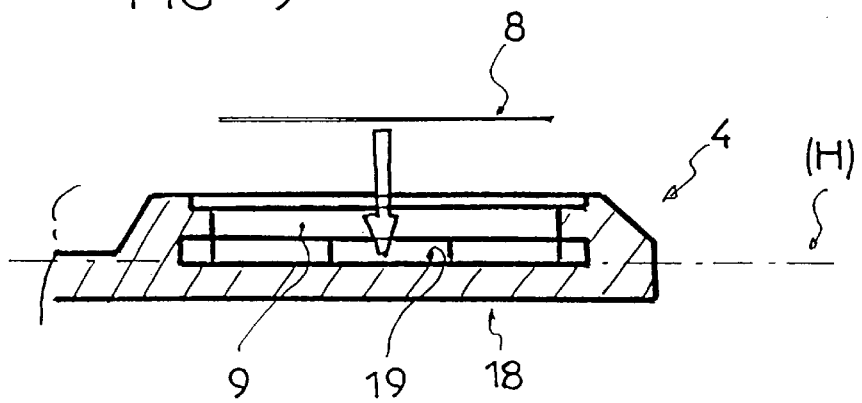
FIG. 9 is a transverse section along section B—B illustrating insertion of the information carrier during the manufacturing process.
Figure 10:
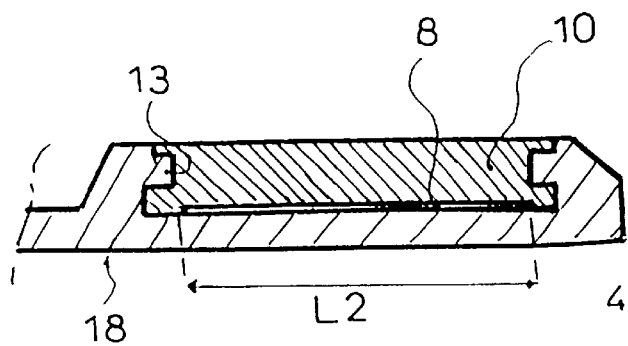
FIG. 10 is a transverse section along section B-B after the filler material has been inserted during the manufacturing process.

With continuing reference to FIGS. 7 and 8 and further reference to FIGS. 9 and 10, the cavity 9 preferably has a square or rectangular shape in a transverse plane H that is parallel to the flat wall 18. The cavity is sized to receive the electronic label 8 on a bottom surface 19 of the cavity. In the preferred embodiment, the cavity is square having a length L1 of between 10 and 20 millimeters, preferably 13 millimeters and a width L2 between 10 and 20 millimeters, preferably 13 millimeters. In embodiments in which the electronic label 8 is other than a 13 millimeter by 13 millimeter square, the dimensions of the cavity are adjusted accordingly.

Figure 11:
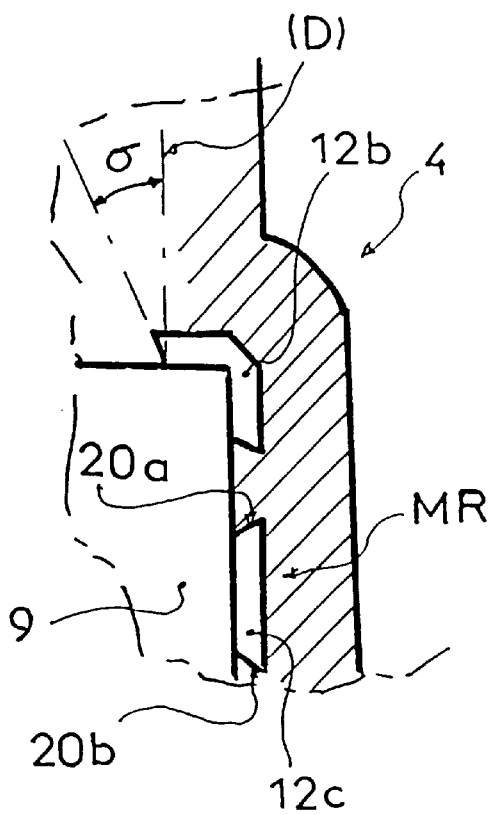
FIG. 11 illustrates details of recessed retainer sections of the female element in a view analogous to FIG. 7.

In the preferred embodiment, the recessed retention sections are preferably of two types, lateral sections 12a, 12c, 12e, 12g which are arranged centered on each of the sides of the peripheral well and angled sections 12b, 12d, 12f, 12h which are situated at the four corners of the cavity. With reference to FIG. 11, the lateral sections include inclined edges 20a, 20b which diverge toward the exterior in the transverse plane H of the flat wall, i.e. form sections which are trapezoidal in the transverse plane with the constricted opening formed toward the interior of the cavity.

The corner or angled sections have a polygonal shape such as an irregular pentagon in the transverse plane H. Their edges are inclined by an angle σ relative to an orthogonal direction D toward the exterior of the sections. The angle σ and the inclination of the edges of the lateral recessed sections are chosen in such a manner as to obtain effective retention of the filler material. On one hand, while providing sufficient elasticity and flexibility to allow mold pieces to be withdrawn, on the other hand.

Figure 12:
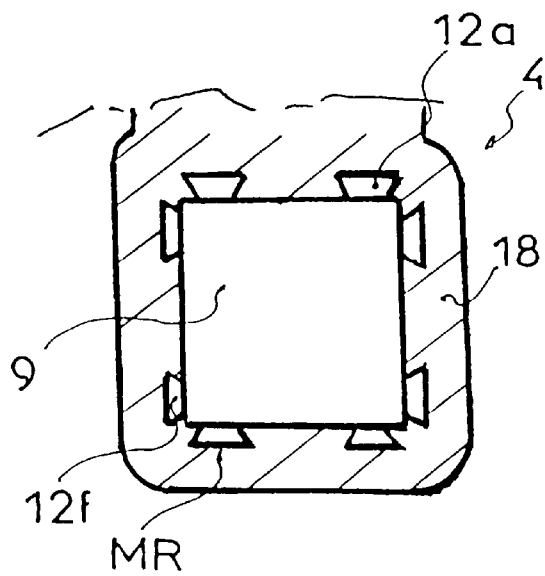
FIG. 12 illustrates an alternate embodiment of the retention sections.
Figure 13:
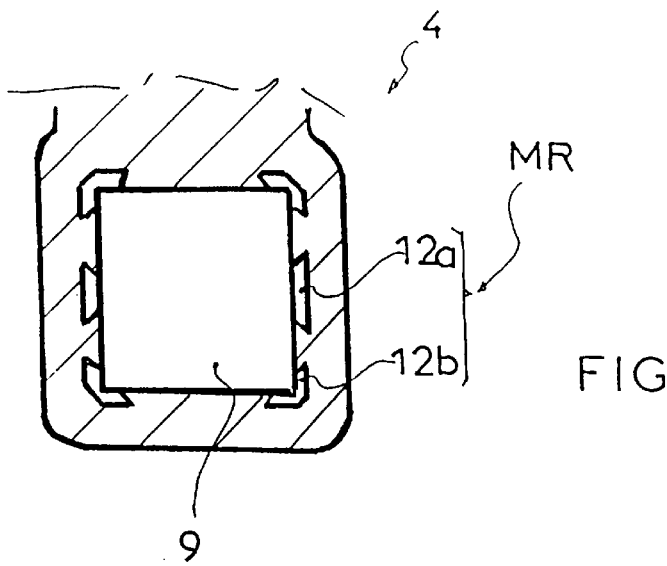
FIG. 13 illustrates another alternate embodiment of the retention sections.

In the preferred embodiment, the retention means MR includes four lateral sections 12a, 12c, 12e, 12g and four corner or angled sections 12b, 12d, 12f, 12h. It is to be appreciated that the exact number of sections and their positions may be varied without departing from the protective scope of this invention. FIGS. 12 and 13 illustrate exemplary alternate embodiments with different arrangements of recessed retention segments.

The retention means MR permits the filler material 10 to be held in place against outside assaults and insures a tightness which protects the electronic label 11. It further provides an inviolate attachment of the electronic label feet in the cavity 9 in a non-reversible manner. That is, gaining access to the electronic label requires destruction or deformation of the filler material or tag in such a manner that it is readily apparent that the identification tag has been opened or violated.

Looking now to the method of manufacture, as illustrated in FIG. 9, the electronic label 8 is placed in the bottom of the cavity. A hardenable resin is poured into the cavity flowing into the recessed retention sections. The resin polymerizes to form a solid body as illustrated in FIG. 10.

After completion of the polymerization process, the resin is rigid or semi-rigid, depending upon the plastic selected and constitutes a single homogeneous piece. The arts of this piece are encased in the recessed retention sections and are blocked from removal by the undercut and dove-tailed shapes. That is, the inclination of the edges of the different retention sections locks the piece in place such that it cannot be extracted from its lodging. The homogeneous piece is locked within the recessed retention set. It is to be appreciated that various techniques can be employed to enhance polymerization of the resin, for example ultraviolet rays.

The manufacturing method further includes a preliminary stage of injection molding the male and female elements including the cavity 9 and the retention means MR to be filled by the filler material 10.

Due to the recessed retention castings 12a, 12b, 12c, 12d, 12e, 12f, 12g arranged around homogeneous piece, the piece grabs the corresponding parts of the tag. This interengagement around the entire zone renders it disassembly proof from the flexible tag. The interlock is also important due to material shrinkage during polymerization.

In addition, a continuous rim 13 midway along the side walls 11 creates a supplemental undercutting to insure interlocking and general tightness between the element and the polymerized resin, note FIG. 8.

It is to be appreciated that the cavity may be defined in either surface of either the male or the female element. To guard the electronic label to the fullest extent against tampering, it is preferred that the female element 4 receive the electronic tag and be located in back of the male element 5. This provides the advantage of preserving a smooth, visible surface on which written or other graphic information can be inscribed.

In the preferred embodiment, the cavity 9 is located on the flat wall 18 of the female element 4 and extends above the transverse plan H. The peripheral wall 11 juts outward from the bottom wall. However, the cavity 9 can be recessed into and defined within the thickness of the flat wall 18 of the female element 4.

Figure 14:
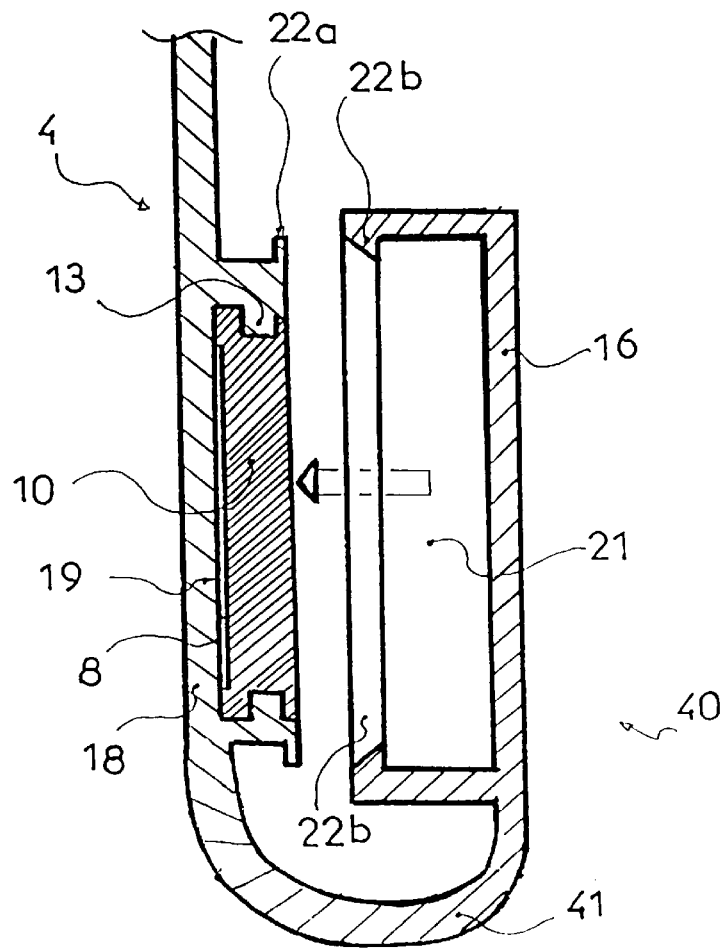
FIG. 14 is a transverse section of an alternate embodiment of the identification tag along section B—B.

With reference to FIG. 14, the identification device can include an additional locking, retention, and tightness means. In the embodiment of FIG. 14, the peripheral wall which projects from the flat wall 18 to define the cavity has a flange 22a at an outer end thereof. A cap or lid 40 is frictionally fit over the peripheral wall to define an additional protective housing. The housing 21 has an inward projecting flange 22b which snaps over and frictionally engages the flange 22a of the peripheral side wall. In the illustrated embodiment, the lid 40 is integrally formed with and connected to the female element 4 by a flexible tab 41.

The embodiment of FIG. 14 provides additional protection to the electronic information carrier 8 by increasing the tightness of the tag and by protecting the homogeneous cured resin piece from the environment.

The polymerizable resins, by nature, may be of a variable rigidity and composition. When the resin is flexible, it can be flexed or formed within the limits provided by the tag.

In another alternate embodiment, a small amount of adhesive resin is inserted into the cavity prior to insertion of the electronic label 8. A second, hardenable resin fills the remainder of the cavity. In this manner, the intrinsic properties of both components are combined.

As another alternative, the recessed retention sections 12a, 12b, 12c, 12d, 12e, 12f, 12g, 12h can be defined in the bottom wall 19 of the cavity, again using dove-tailed shapes or the like to lock the two together mechanically. In another alternate embodiment, the bottom wall 19 or the peripheral wall 11 defines a positioning means or guides for positioning the electronic label without hindering the filler material from entering into the recessed retention sections.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An identification tag comprising:
    a male element configured to pass through a portion of a tagged object;
    a female element which is interconnectable with the male element to lock the tagged object therebetween;
    a carrier portion extending from one of the male and female elements, the carrier portion including:
        a peripheral wall surface and a bottom wall surface which define an enclosed, interior cavity;
        recessed retention sections within the enclosed, interior cavity undercutting the peripheral wall surface;
    an information carrier disposed in the cavity;
    a filler material received in the cavity over the information carrier, portions of the filler material being received more deeply in the recessed retention sections to have a larger cross-sectional dimension than portions received in the recessed retention sections less deeply in the cavity to lock the filler material and the information carrier in the cavity.

2. The identification tag according to claim 1 wherein:
    the one of the male and female elements which defines the cavity is made of injection molded plastic.

3. The identification tag according to claim 1 wherein:
    the cavity is defined on an internal surface of the female element facing the male element.

4. A method of making an identification tag according to claim 1, the method comprising:
    placing the information carrier in the cavity;
    pouring the filler material into the cavity in a fluid form;
    hardening the filler material into a solid form.

5. The identification tag according to claim 1 wherein the information carrier includes a solid state element which records information electromagnetically.

6. The identification tag according to claim 1 wherein the recessed retention sections further comprise:
    lateral recessed retention sections; and,
    angled recessed retention sections.

7. The identification tag according to claim 1 wherein the peripheral wall surface converges away from the bottom wall surface.

8. The identification tag according to claim 1 further including:
    a continuous rim extending inward from the peripheral wall surface displaced from the bottom wall surface.

9. The identification tag according to claim 1 wherein the recessed retention sections are dove-tailed with the filler material.

10. An identification tag comprising:
    a first element and a second element which are interconnectable with each other and an object to be identified;
    the first element defining an interior, enclosed shallow well defined by a bottom wall and a peripheral wall of low height compared to a major dimension of the bottom wall;
    the peripheral wall having undercut regions within the interior, enclosed well, adjacent the bottom wall which extend under upper portions of the peripheral wall;
    an identification element disposed in the well adjacent the bottom surface;
    a resin filler that is capable of being poured at room temperature into the well flowing into the undercut regions and flowing over and encompassing the identification element and hardening into a solid resin, the hardened resin filler filling the cavity and extending into the undercut regions to lock the filler material and the identification element into the cavity.

11. An identification tag comprising:

a male element having a dart and a flat wall portion;

a female element which is interconnectable with the dart of the male element, the female element having a flat wall portion, the male and female portions being connected with each other and adapted for attachment to an object to be identified;

an interior, enclosed cavity, having a bottom and at least one side wall, defined at the flat wall portion of at least one of the male and female elements displaced from the dart, and within the interior, enclosed cavity, at least one of recessed and undercut locking regions extending behind portions of the flat wall portion;

an information carrier disposed in the cavity;

a filler material received in the cavity over the information carrier and extending into the locking regions to lock the information carrier in the cavity.

* * * * *